United States Patent [19]

Woodward et al.

[11] 3,839,707

[45] Oct. 1, 1974

[54] FAULT-ALARM AND CONTROL FOR A MICROWAVE COMMUNICATION NETWORK

[75] Inventors: Dean R. Woodward; Karl C. Wehr, both of West Chester; Lionel J. Wollner, Chester Springs; Joseph R. Bienas, Souderton, all of Pa.; John E. Kelsey, Arlington, Va.; John J. O'Neill, Center Square; Leonard H. Sichel, Jr., Bryn Mawr, both of Pa.

[73] Assignee: Burroughs Corporation, Detroit, Mich.

[22] Filed: Dec. 29, 1972

[21] Appl. No.: 319,638

[52] U.S. Cl. .... 340/172.5, 179/15 BF, 179/175.2 R, 340/409

[51] Int. Cl. .... G06f 11/00

[58] Field of Search .... 340/172.5, 409, 146.1 R; 235/153 R, 153 AC, 153 AK; 179/15 BF, 175.2 R, 175.3

[56] References Cited

UNITED STATES PATENTS

| | | | |
|---|---|---|---|
| 3,087,991 | 4/1963 | Anderson et al. | 179/175.2RX |
| 3,259,695 | 7/1966 | Ryuichi Murakami | 179/15 BF |
| 3,430,231 | 2/1969 | Weld | 340/409 |
| 3,431,369 | 3/1969 | McLaughlin | 179/175.3 |
| 3,491,340 | 1/1970 | Richman et al. | 340/172.5 |
| 3,493,683 | 2/1970 | Schlichte et al. | 179/15 BF |
| 3,626,383 | 12/1971 | Oswald et al. | 340/172.5 |
| 3,651,471 | 3/1972 | Hazelwood et al. | 340/172.5 |
| 3,653,041 | 3/1972 | McGrath et al. | 340/409 |

*Primary Examiner*—Paul J. Henon
*Assistant Examiner*—Melvin B. Chapnick
*Attorney, Agent, or Firm*—John J. Simkanich; Edward J. Feeney, Jr.; Edward G. Fiorito

[57] ABSTRACT

A maintenance system and method is provided to alarm faults detected in a switched-data microwave communications network, and to initiate control messages for corrective action. Located at the transmission nodes (stations) of the microwave network may be nodal monitors, which may sense the local faults detected, and initiate limited corrective action. Supervising respective districts of such nodal monitors, may be district processors which can review fault messages from, and initiate corrective messages to, the local (nodal) monitors. Nodal monitors are preferably linked, communicatively, in series with each other and with the district processor.

12 Claims, 8 Drawing Figures

PATENTED OCT 1 1974

3,839,707

SHEET 1 OF 5

Fig I

FAULT-ALARM AND CONTROL FOR A MICROWAVE COMMUNICATION NETWORK

BACKGROUND OF THE INVENTION

Microwave communication involves a complicated collection of transmission, waveguide, antenna and communications technology. Each technology in itself has proven to be extremely involved. However, when these technologies are combined to produce a switched data or digital microwave communications network the operation and control of such a network becomes very complicated. in the past, the monitoring of a microwave transmission system has been accomplished by operator control or by a combination of analog, hardwired, electronic sensors and a computer assisted central operator control. Typical of such a monitoring system is the American Electric Power's microwave system as discussed by D. H. Hamsher, Communication System Engineering Handbook, (McGraw-Hill, New York, N.Y.) 1967 16–45.

For the supervision of these systems local sensors situated at supervisory stations detect and report system status to the central computer. However, the development of supervisory equipment is ever dependent upon the system monitored. In recent years microwave communications systems have borrowed technology from other types of communications systems so that frequency shift keyed modulation with time division multiplexing is now being proposed instead of frequency modulation with frequency division multiplexing. The advantage of a time division multiplexing system is that it interfaces easily with digital equipment.

A line-of-sight system poses enormous problems to the typical monitoring system. The number of variables to be monitored will increase tremendously and the versatility of each sensing station must be increased to handle large numbers of new problems. Studies have shown that the greatest number of microwave system faults occur in fading or loss of channel signals. (See Hamsher, supra at 16–52) It is therefore important for monitoring sensors to monitor the received signal levels of the microwave channels as well as the status of the various station equipment and any maintenance information which may be transmitted around the system. This means that the monitors and sensors must be capable of handling a large number of inputs. To use present equipment would require a large number of "ganged" sensors at each monitoring station. This in turn would require extensive communications to the central computer and increase the operating requirements in both speed and capacity of this central computer.

Microwave communication network supervisory control system have been developed for the power industries. Electric power companies employ them in the monitoring and supervision of power generating stations. Oil companies use them in the monitoring and supervision of gas wells and oil wells. These systems communicate between remote stations and a district supervisor via independent microwave transmission. Communication between individual remote stations and a district supervisor has been a parallel operation.

Parallel operation supervisory systems have taken two forms. The first has a constant individual line of communication between each remote station and the district supervisor. Each remote station transmits and operates independantly of other remote stations. The district processor has a transmission receiving/transmitting terminal for each remote station under its supervision. In the second type of parallel system, each individual remote station is tied in parallel with other remotes to the district processor. However, the district processor does not process all remote station information simultaneously but sequentially monitors each line to process data. Parallel transmission connections between each remote station and the district processor are constantly maintained.

It would be advantageous to have a monitoring system where the monitoring sensors had increased capability and at least partial intelligence and could be readily distributed throughout the network. It would be advantageous to have a monitoring system that could be easily adapted to meet changing operational requirements.

It is an object of this invention to provide a monitoring system and method for both fault alarm and for fault control.

It is also an object of this invention to provide such a monitoring system and method in which the nodal monitors and the supervisory stations (district processors) are capable of handling large amounts of data at one time.

It is a further object of this invention to provide such nodal monitors to be microprogrammable wherein their sequencing and control algorithms may be changed without hardware changes and wherein these nodal monitors could perform control as well as sensing functions.

It is also an objective of this invention to provide a monitoring system and method wherein communication between nodal monitors and their supervisory station (district processor) is serial, i.e., nodal monitors (remote stations) are serially tied to the district processor.

It is a further objective of this invention to provide that a neighboring district processor be able to take over supervision of a district when that district's supervisory processor is disabled.

SUMMARY OF THE INVENTION

Microwave transmission network operating stations may be maintained with the utilization of a fault-alarm and control system and method which can recognize fault conditions detected at network stations, alarm fault conditions to a district center, decide corrective action to be taken and initiate corrective orders.

A multiplicity of district processors preferably monitor respective sections or districts of the network by performing time division analysis on maintenance channel signals received from their respective districts which may describe the status of the network in the district, the status of the transmission through the district and the operating status of the adjacent district processor. District processors are preferably capable of communicating with a central network computer and may either initiate a corrective action in their respective districts when a fault is recognized or report and relay maintenance information between their respective districts and the central network computer. District processors may be microprogrammably changeable so that as network operational requirements change their individual functions may be reprogrammed without hardware modification.

Nodal monitors (remote stations) are preferably located at each of the network's nodes, or transmission stations, for monitoring the status of their respective portions of the network which may include the operating status of the equipment in the transmission station, the quality of the transmission received by the station and the status of maintenance information on the maintenance communication channel. Each nodal monitor may communicate with its district processor via the maintenance channel on which it transmits status it has monitored. Having determined a fault has occurred a nodal monitor may either initiate corrective action or wait and implement a corrective mandate received from its district processor. Nodal monitors may be microprogrammably changeable so that as network requirements change they may be individually reprogrammed without hardware implementation Intelligence capabilities of nodal monitors may preferably be less than the capabilities of district processors. The number of nodal monitors distributed throughout the network is much greater than that of district processors. Each nodal monitor may be required to monitor as many as 416 digital test points and transmit their status to its respective district processor while performing intelligence (control processing) to initiate a limited number of corrective actions.

BRIEF DESCRIPTION OF THE DRAWINGS

The novel features of this invention, as well as the invention itself, both as to its organization and method of operation, will best be understood from the following description taken in connection with the accompanying drawings in which like characters refer to like parts, and in which.

DETAILED DESCRIPTION OF THE INVENTION

This invention relates to an apparatus and a method for fault-alarm and control of a microwave transmission network wherein a remote alarm and control monitor may be located at each node in a microwave transmission network. Nodal monitors are communicatively linked in series with one another and to an area or district supervisory processor via a maintenance channel of the microwave transmission.

Figure 1:
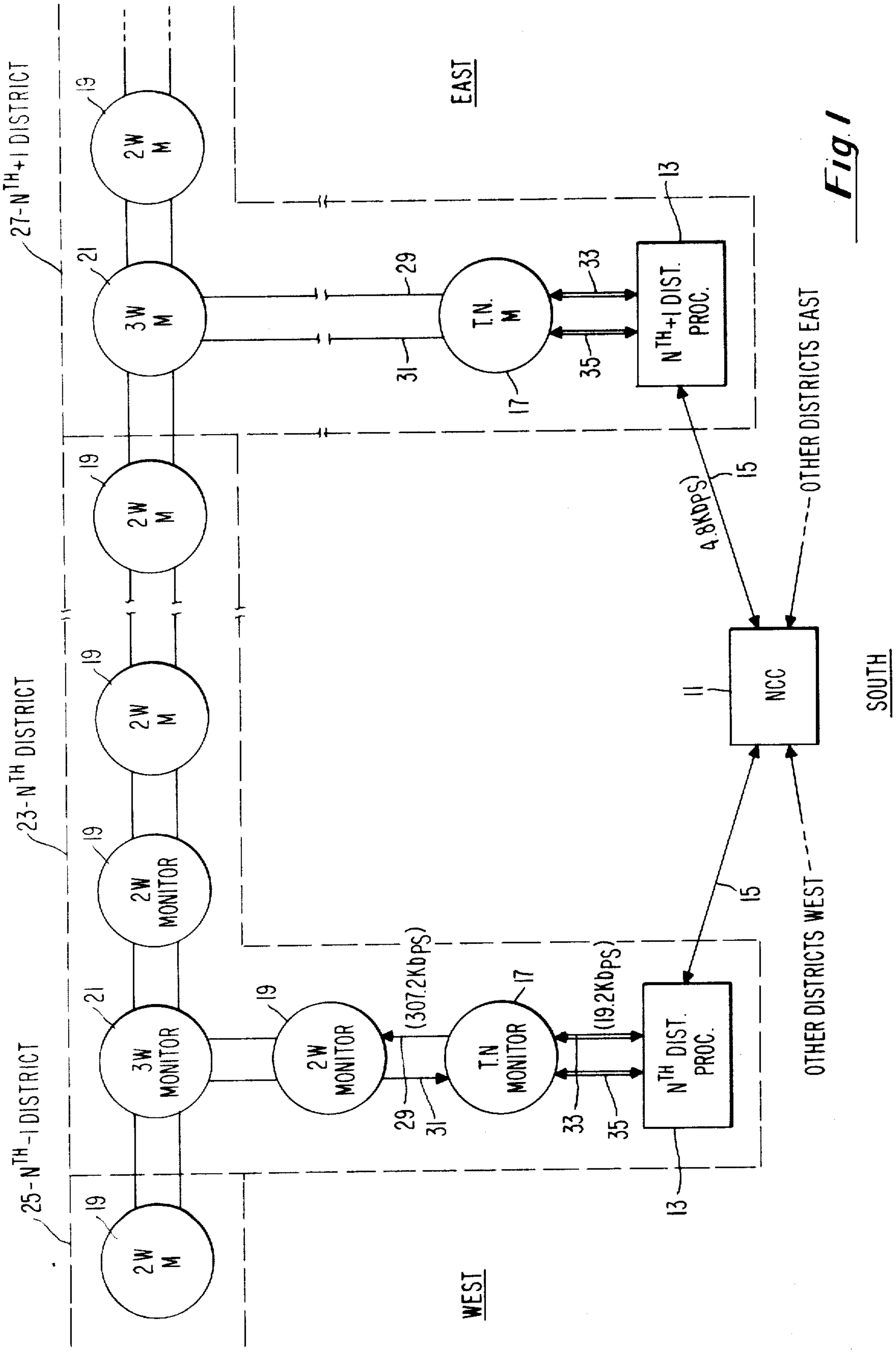
FIG. 1 is a block diagram of a representative portion of the invention for a district of the network illustrating the configuration of the invention and th relationship between the basic building blocks the district processor and the nodal monitors.

In the preferred embodiment of the invention, FIG. 1, a network control center 11 is manned on a full time basis and receives system status communication from all of the district processors 13 which are manned part time. District processors 13 communicate to the network control center (NCC) 11 via independent or shared communications lines 15. Individual monitoring sites are unmanned except when maintenance is underway. These monitoring sites are located at each of the nodes of the network and are electronically connected via 307.2 kbps maintenance channels 29, 31 which are amplitude modulated on the FM microwave transmission and include terminal node monitors 17, two-way nodal monitors 19 and three-way nodal monitors 21.

In the operation of the monitoring system, each $N^{th}$ district processor 13 is responsible for supervising the $N^{th}$ district 23 with an alternate responbility for supervising the $N^{th}$-1 district 25. This is accomplished by the manner in which the monitoring system is operated and where maintenance information is stored. Primary maintenance information storage for the $N^{th}$ district 23 is in district processor 13 for the $N^{th}$ district an alternate storage of this information is maintained in district processor $N^{th}$ + 1 (13) for the $N^{th}$ + 1 district. Typically, a maintenance signal is sent out from the $N^{th}$ district processor 13. This signal is a coded word containing addresses and information spacing. The message work passes via transmitting channel 29 through each of the nodal monitors 17, 19, 21 which deposit network status information in a specific assigned location of the word as it passes through their node. The completed word with $N^{th}$ district's 23 complete status for that period of time is received at $N^{th}$ + 1 district processor 13. This $N^{th}$ + 1 district processor 13 stores the information and then sends the empty status word back to $N^{th}$ district processor 13 via a return channel. As the message word again passes through each of the nodal monitors 17, 19, 21 they again deposit the same status information. When this word reaches the $N^{th}$ district processor 13 the status information is stored in the processor's memory. The $N^{th}$ district processor 13 then decodes what action is to be taken. The monitoring system therefore uses two maintenance channels 29, 31, which operate at 307.2 K bits per second, to communicate east and west, respectively, via a transmitted "district status word," which may also be termed the "maintenance information message."

If the status of the district is satisfactory the district processor 13 will take no action but relay a status to NCC 11 upon request of NCC 11. If a fault is detected, and corrective action is not automatically handled at the node where the fault is detected, either a corrective mandate is generated by district processor 13 and transmitted to the particular node where the fault was detected via the next maintenance information message sent (the more likely event), or fault report received by processor 13 is relayed to NCC 11 upon request of NCC 11. In this situation NCC 11 would generate the corrective action mandate but this could occur only after NCC 11 requested a status report. In the case where the NCC 11 decides the corrective action the district processor functions as a relaying and recording device. In the case where district processor 13 dictates the corrective action it also records status. In either case status information is sent to NCC 11's storage banks upon request. District processors 13 will be discussed in more detail below.

Nodal monitors 17, 19, 21 are capable of limited intelligence. They sense network conditions and transmit this information to district processors 13 via the maintenance information messages. As part of these nodal monitors capability they may initiate limited corrective action as a result of fault detection. This intelligence function will be further discussed below as part of a detailed discussion of the nodal monitors 17, 19, 21.

Each of the nodal monitors 17, 19, 21 operates at 19.2 K bps. The district processor 13 which communicates to its district via that district's terminal node 17 sends and receives information from the terminal node 17 via 19.2 K bps lines 33, 35, respectively.

District size, that is the number of nodes composing a district, is limited by the length of the maintenance information message which must hold the status information supplied by each nodal monitor, and address and synchronization information used to locate specific nodal status reports. In the preferred embodiment the maintenance information message is 600 bits long of which 416 bits are reserved for system status information. Each district has up to 35 nodal monitors 17, 19, 21 one of which is a terminal node 17, one of which is a three-way node 21 and the other 33 are two-way nodes 19 which may be distributed in the terminal node 17 link of the network and in the main trunk link of the network. Further discussion of status and also control communication is given below.

District processors 13 may be implemented with a Burroughs Series D, interpreter-based system as described by Faber, in Belgium Patent No. 750,068, issued May 6, 1970, or French Patent No. 7,016,550, issued Mar. 1, 1971, or U. S. Ser. No. 825,569 and described again by Zucker et al. in U.S. Pat. application Ser. No. 253,834. Alternatively processors 13 may be implemented by a Burroughs B1700 or machine of equivalent capability. The structure of the district processors 13 are microprogrammably modular to permit expansion of the microprocessor subsystem to accommodate future growth and to permit reconfiguration to an optimum cost and performance design. Another description of the processors 13 as described above by incorporation by reference may be obtained from E. W. Reigel, U. Faber and D. A. Fisher, "The Interpreter: A Microprogrammable Building Block System," *AFIPS Conference Proceedings, Joint Computer Conference-Volume* 40 (AFIPS Press, Montvale, N.J. May 1972).

Figure 2:
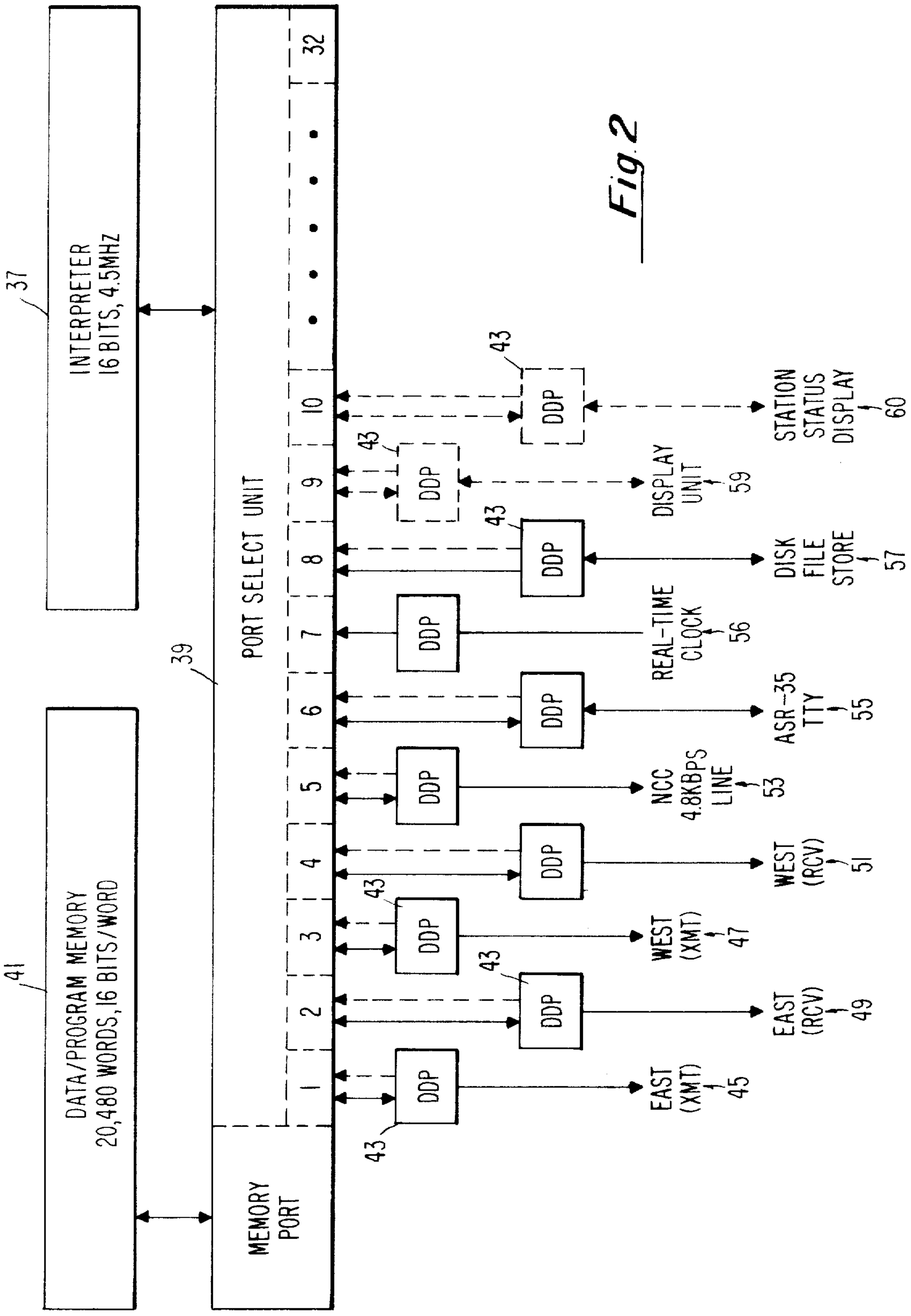
FIG. 2 is a block diagram of a district processor.

FIG. 2 shows a functional block diagram of a district processor 13 which consists of a 16-bit Series D Interpreter 37, as referenced above, ties to a port-select unit 39 wherein the port-select unit 39 is capable of functionally interfacing up to 32 devices (or communications lines) to the Interpreter 37. Port select unit 39 may be implemented as described by Faber, supra, as part of his interpreter based system. Alternatively, port select unit 39 can be the port select unit included in the Burroughs B-380 Disk Pack Control, as announced for sale April 1971. A data and program memory 41 consisting of 20, 480, 16-bit words is tied to the memory port of port-select unit 39. Device dependent ports (DDP) 43 are tied to each port of port-select unit 39 and interface this unit 39 with such hardware as transmitting and receiving lines 45, 47 and 49, 51, respectively, for district status word communication. Device dependent port 43 (DDP) may be implemented as described by Faber, supra. Alternatively, device dependent port 43 can be the DDP included in the Burroughs B380 Disk Pack Control, as announced for sale April 1971.

From the above description of FIG. 2, in reference to FIG. 1, it can be seen that a district processor 13 is tied to terminal node 17 via lines 33, 35. Line 33, FIG. 1, comprises the east and west transmitting lines 45, 47, as shown in FIG. 2, by which an $N^{th}$ district processor 13 transmits status words east, via line 45, as shown in FIG. 2, to $N^{th}+1$ district processor 13; and west transmits via line 47 to $N^{th}-1$ district processor 13. Line 35, of FIG. 1, comprises east and west transmitting lines 49, 51, FIG. 2, by which $N^{th}$ district processor 13 receives district status words east via line 49, (FIG. 2) from $N^{th}+1$ district processor 13 and west via line 51, FIG. 2, from $N^{th}-1$ district processor 13. The 4.8 Kbps (kilo-bits per second) line 53, which is shown as communications line 15 in FIG. 1, is used for communication with NCC 11, (FIG. 1). As seen from FIG. 2, various peripheral devices such as terminal unit 55, disk file 57 and visual display unit 59 may also be interfaced to port select unit 39 by means of additional DDP 43 devices.

Figure 3:
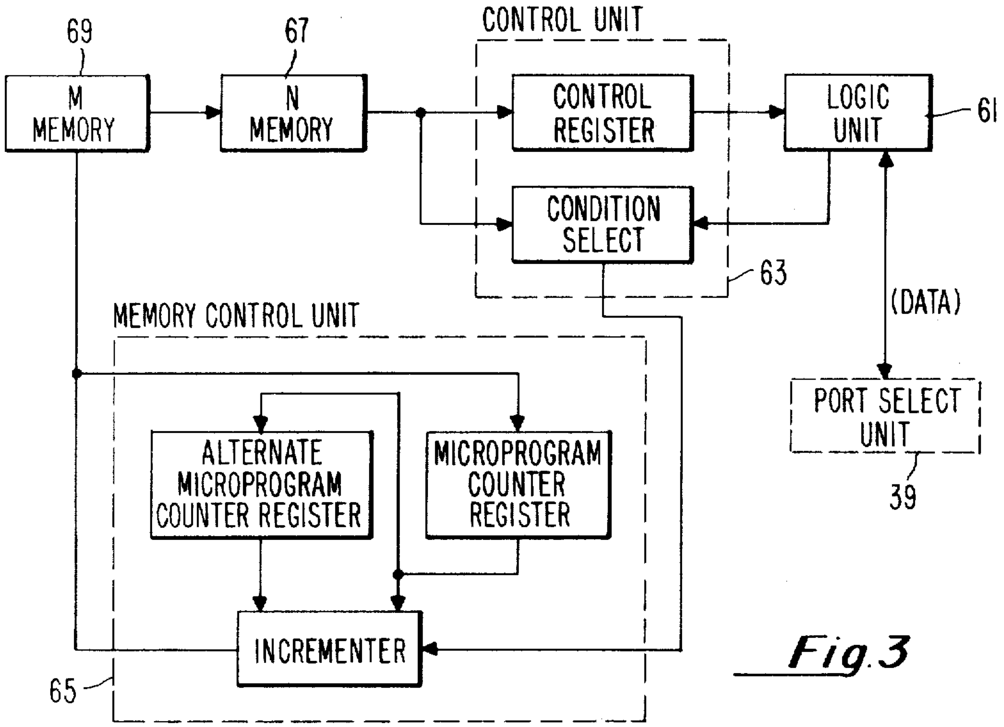
FIG. 3 is a block diagram of the interpreter of a district processor.

The interpreter 37, FIG. 2, as described in the Faber reference, supra, is partitioned into five parts as shown in FIG. 3. Logic unit 61 interfaces port select unit 39 and is tied to control unit 63, memory control unit 65 and nanomemory (N memory) 67. Micromemory (M memory) 69 is tied between memory control unit 65 and N memory 67. When the Interpreter is active, microprogram instructions and literals (data, jump addresses, shift amounts) are read out of the microprogram memory (M memory) 69. Data and jump addresses from the M memory 69 are gated to the memory control unit (MCU) 65, shift amounts are gated to the control unit (CU) 63, and instructions are used as addresses for the nanomemory (N memory) 67. Output of the N memory 67 (selected as a result of M) memory 69 address) is a set of 56 enable signals which are transmitted to he CU 63, MCU 65, and Logic Unit (LU) 61. The LU 61 performs all of the arithmetic, Boolean logic and shifting operations. Addressing of the M memory 69 is accomplished by selecting one of two microprogram count registers in the MCU 65 and by using either the contents of the selected register, the contents plus one, or the contents plus two as an address to the M memory 69. LU 61, in addition to performing the arithmetic and logic functions, provides a set of scratch-pad registers and the data interfaces to and from the port select unit (PSU) 39. A significant feature of the LU 61 is its 8-bit modularity which permits expansion of the basic 8-bit word length to 64 bits in increments of 8 bits. Cu 63 contains a condition register and logic for condition testing, a shift amount register for controlling shift operations in LU 61, and a control register for storage of control signals. MCU 65 provides addressing logic to PSU 39 for data accesses to memories and devices, and controls for the selection of microinstructions literals, and counter operations. MCU 65 is also expandable when additional addressing capability is required. N memory 67 decodes microinstructions (addresses) from the M memory 69 and generates combinations of 56 control signals which feed the Cu 63, MCU 69, and LU 61.

Data/program memory 41 (FIG. 2) consists of 20,480 16-bit words implemented with 750- nanosecond, read/write nonvolatile core memory and is directly addressable by Interpreter 37 (FIG. 2) via the port select unit 39 (FIG. 2). This memory 41 can be expanded to a maximum of 65,536 16-bit words. Data/- program memory 41 (FIG. 2) is used to store programs, tables, buffers, and operands which drive the microprograms residing in the M memory 63 of Interpreter 37 (FIG. 2). It is also used to buffer data received or sent to the various devices (or communication lines) of the District Processor 13.

Port select unit 39 (FIG. 2) described in the reference cited above provides control interfaces between Interpreter 37 (FIG. 2) and the various devices of the District Processor 13 (FIG. 1). Port select unit 39 performs the following functions: decodes the DDP 43 (FIG. 2) addresses from the Interpreter; provides the appropriate control signals to each DDP 43 to control data transfers; controls the status of each DDP 43 as determined by Interpreter 37; receives interrupts from each DDP 43 and forwards these interrupts to Interpreter 37, based on the present DDP 43 status; performs priority resolution of the DDP 43 interrupts; responds to interrogation from Interpreter 37 with the address of the highest priority DDP 43 that provides an interrupt; and provides a control signal to the appropriate DDP 43 to enable status information to Interpreter 37. A maximum of 32 device dependent ports (DDP) 37 can be controlled with port select unit 39.

Device dependent ports (DDP) 43, (FIG. 2) described in the reference cited above are used as interfaces between Interpreter 37 via PSU 39, and specific peripheral devices. A DDP 43 performs level conversion and interprets signals which are sent to or received from a peripheral device. DDP 43 may be used to perform parallel-to-serial and serial-to-parallel conversions, and may also be required to perform basic timing and buffering of data. All functions performed by a DDP 43 are dependent on its specific application to a specific device. Every type of peripheral device has its own DDP 43, however, more than one device of the same type may be connected to the same DDP by means of an exchange network provided for a particular system configuration. This feature provides for convenient, low-cost system expansion.

Interfaces between Interpreter 37 and a DDP 43 vary, but certain control signals are common to all DDP's. These control signals are designated as either a status interrupt signal or a data interrupt signal. Status interrupt signals and data interrupt signals are sent to the condition-select circuits of the control unit 59 (FIG. 3) via the port select unit 39 (FIG. 2). These interrupts are interpreted as status interrupt and/or data interrupt signals from DDP's 43 according to the status of the particular peripheral device.

Devices used by the invention and connected to district processor 13, (FIG. 1) port select unit 39 (FIG. 2) include:

- an eastbound, full-duplex 19.2 Kbps communications line 45, 49 (FIG. 2);
- a westbound, full-duplex 19.2 Kbps communications line 47, 51 (FIG. 2);
- a single, multidrop, half-duplex 4.8 Kbps communications line 53 (FIG. 2);
- an ASR-35 teletypewriter 55 (FIG. 2);
- a real time chronometer 56 (FIG. 2);
- a 2.5-million byte disk cartridge storage system 57 (FIG. 2);
- a fully buffered, visual display unit (VDU) 59 (FIG. 2) with alphanumeric keyboard; nd
- a station status display 60 (FIG. 2).

Each district processor 13 (FIG. 1) interfaces with two full-duplex, 19,200-bps communications lines received from the local terminal node monitor 17. Terminal node monitor 17 interfaces with two full-duplex, 19,200-bps communications lines. Each duplex circuit occupies two ports (transmit and receive) of the port select unit 39, (FIG. 2) and each will require a device dependent port 43. The DDP 43 of each circuit of each duplex line provides a double buffer of two characters (16 bits per buffer) and an associated interrupt line. This arrangement will cause an interrupt to district processor 13, (FIG. 1) to be generated each time two characters (832 microseconds) are accumulated.

All district processors 13 (FIG. 1) may communicate with the Network Control Center (NCC) 11, FIG. 1, via a single, multidrop, half-duplex, 4800-bps communications line in a poll and select mode. The poll and select procedure is under the control of NCC 11. DDP 43, FIG. 2, associated with this line will double buffer 9 bits (8 bits plus parity) and will generate a "poll interrupt" upon receipt of a poll character. In receive mode, a "character interrupt" is generated for all other characters, except synch characters which will by automatically stripped by the DDP 43 to preserve processing time. In transmit mode, this same "character interrupt" will be generated to request another character.

The nodal monitors as described above can be of three types: terminal node monitor 17 (FIG. 1); two-way nodal monitor 19 (FIG. 1) and three-way nodal monitor 21 (FIG. 1).

Figure 4:
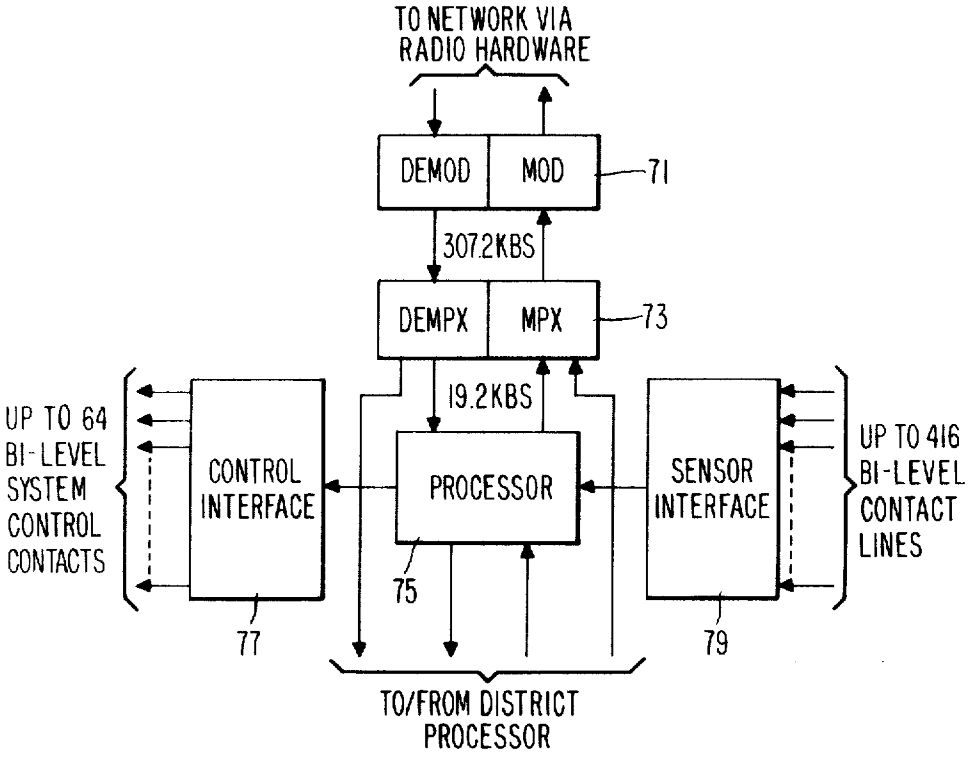
FIG. 4 is a block diagram of a terminal node monitor.

Terminal node monitor 17 (FIG. 1) is shown in detailed block representation in FIG. 4 and includes modulator/demodulator 71 which interfaces the monitor 17 with the network's transmitting and receiving time multiplexed maintenance channels 29, 31, respectively, as received from network radio hardware, for differentiating the maintenance channel signals from amplitude modulation of the FM microwave carrier. Multiplex/demultiplexor 73 connected to modulator/-demodulator 71 is a channel interface for differentiating the fault alarm and control communication signals (maintenance information messages) from other maintenance channel signals and wherein multiplexor/-demultiplexor 73 utilizes time division analysis. A microprogrammed "mini" computer is used as processor 75 and is tied to multiplexor/demultiplexor 73 and district processor 13 (FIG. 1) through 19.2 Kbps data lines, which lines were discussed above in the discussion of district processor 13. The microprogrammed processor 75 is controlled by microprograms stored within pluggable read-only-memories (ROM) wherein the microinstructions may be changed by exchange of ROM's without physical hardware modification. This processor 75 is used for high speed and/or data input-/output computation and control and may be of the minimicroprogrammable type available on the market such as a Microdata Corp., "Micro 800." Processor 75 is also tied to control interface 77, via which the processor 75 is able to control up to 64 network control relays. Processor 69 is also tied to sensor interface 79 via which processor 75 monitors up to 416 digital network status signals. These interfaces 77, 79 may previously exist in the transmission network and can take the form of commonly available control circuits and sensors including such common devices as diode switches, impedance meters and the like.

Figure 5:
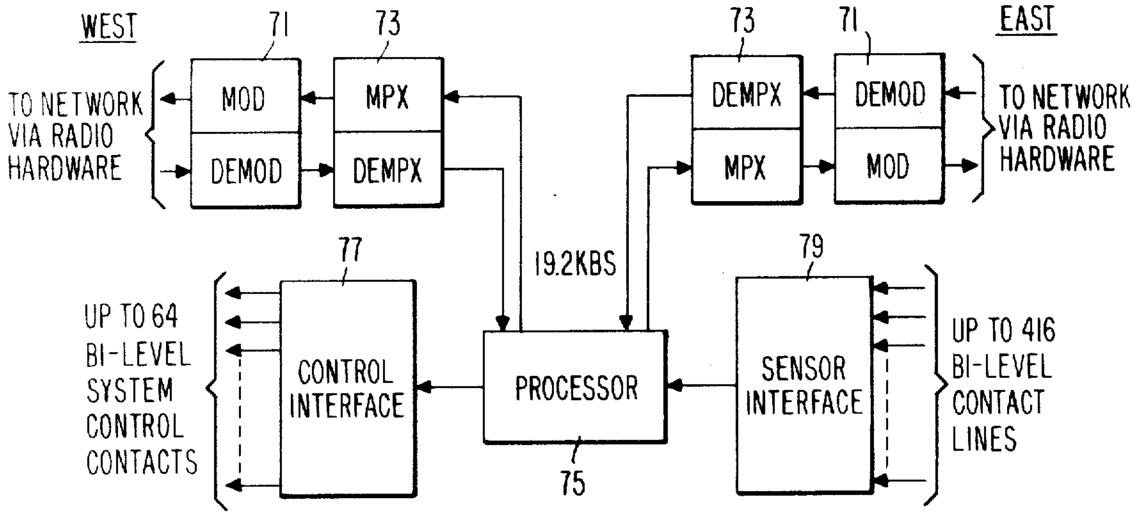
FIG. 5 is a block diagram of a two-way nodal monitor.

The configuration to two-way nodal monitor 19 (FIG. 1) is similar to terminal node monitor 19 except that monitor 19 has two interfaces with the network radio hardware for two-way transmission e.g., east and west, and also does not directly connect to district processor 13 (FIG. 1). FIG. 5 is a detailed block representation of a two-way nodal monitor. Two modulator/-demodulators 71 interface east and west paired microwave transmission channels 29, 31 one to each pair as received from network radio hardware. Two multiplexors/demultiplexors 73 tied one to each to the east and west modulators/demodulators 71 separate the maintenance information messages (district status word) from other maintenance channel signals. Processor 75 is tied to both east and west multiplexors/demultiplexors 73 for receiving and sending maintenance information meassages and for monitoring network status of up to 416 conditions via sensor interface 79 and controlling up to 64 network conditions via control interface 77.

Figure 6:
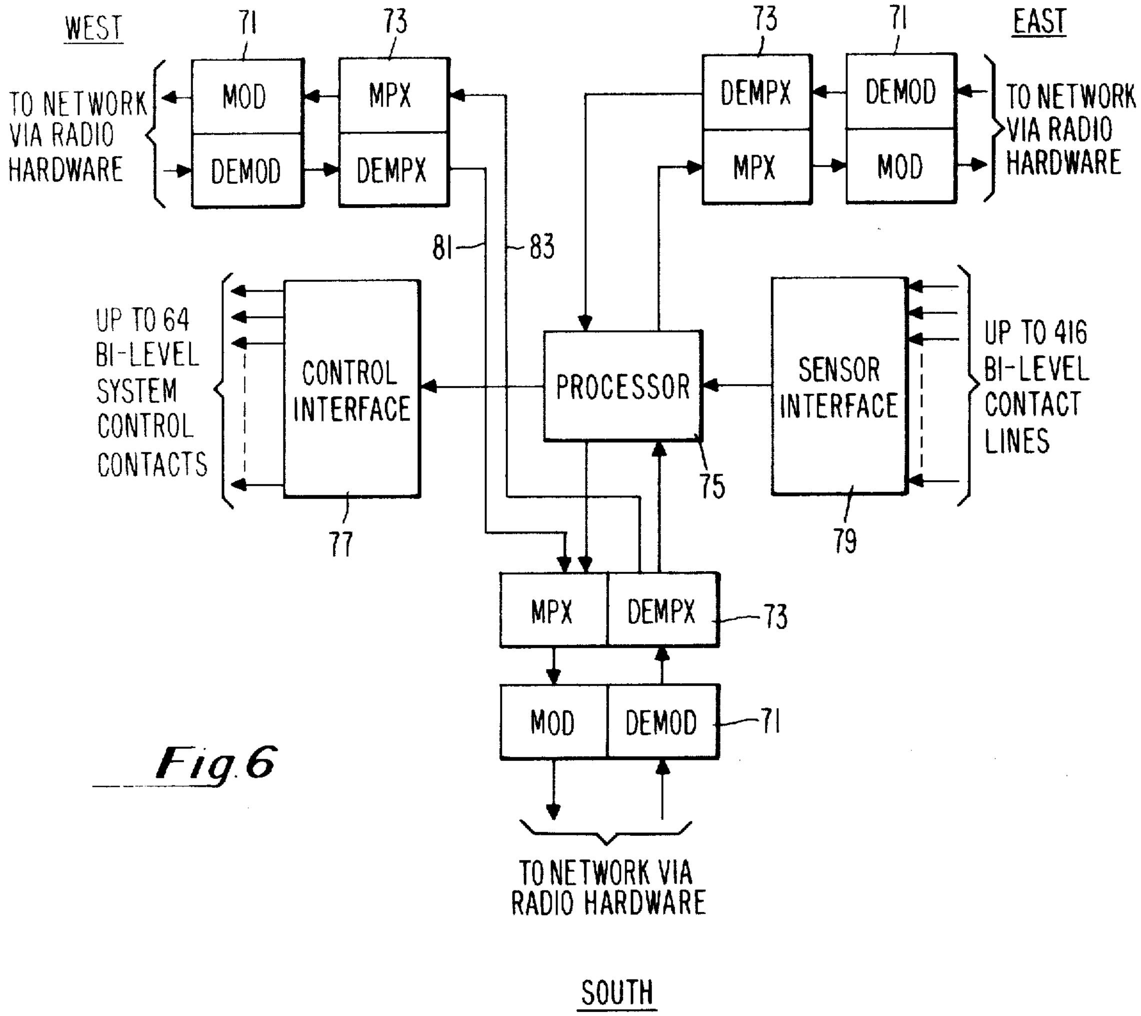
FIG. 6 is a block diagram of a three-way nodal monitor.

The configuration of three-way nodal monitor 21 (FIG. 1) is similar to two-way nodal monitor 19 except that monitor 21 interfaces with the network for three-way transmission e.g., east, west and south. However, west-south transmission bypasses the processor. FIG. 6, block representation of a three-way nodal monitor, shows three modulators/demodulators 71 interfacing east, west and south microwave transmissions channel pairs 29, 31, one to each, which are received from network radio hardware. Three multiplexors/demultiplexors 73 tied one to each of the east, west and south modulators/demodulators 71 separate the maintenance information messages from other maintenance channel signals. However, processor 75 is tied only to the east and south multiplexors/demultiplexors 73. Thus, east-south maintenance-information-messages are processed by processor 75 while west-south messages are not. West-south maintenance information messages pass between west and south multiplexors/demultiplexors 73 via west to south communications line 81 and south to west communications line 83.

The multiplexor/demultiplexor 73 (FIGS. 4, 5 and 6) provide 16 individual full duplex channels, one of which is used for framing and 15 of which can be used for carrying maintenance signals and digitized voice intercommunication. Each monitor 17, 19, 21 uses one of these channels for two-way communication to the processor. Three-way nodal monitor uses an additional channel for two-way communication between west and south (FIG. 6).

Each nodal monitor 17, 19, 21 is therefore capable of communicating the network status of its assigned area to its district processor and alternate district processor. In addition, each monitor is capable of monitoring up to 416 signals to determine station status and performing decision processes to control up to 64 station controls.

Each district processor 13 (FIG. 1) operating through 19.2 Kbps circuit derived by multiplexor 73 (FIG. 4) from the 307.2 Kbps maintenance channel, communicates via a "scan message technique," heretofore termed "maintenance-information-messages" including district status words, with the monitor at each of the radio sites in both its primary sector and in the sector for which it is backup. The conductivity between two district processors 13 (FIG. 1) and their common group of nodal radio sites was introduced in the discussion of FIG. 1. This communication results in the constant updating of the district's status in the respective primary and backup file in each district processor and the constant updating of network status in the network central control.

These maintenance information messages (scan messages) are 600-bit message "groups" sent in each direction. These messages include spaces for control mandates to specific nodal monitors prefixed with the address of that monitor, and fault alarm report spaces for reports from each nodal monitor. As the message is read by each monitor and then passed on, the proper control mandate is read and that monitor's status report or fault alarm is deposited in the "message" at its proper location.

Figure 7:
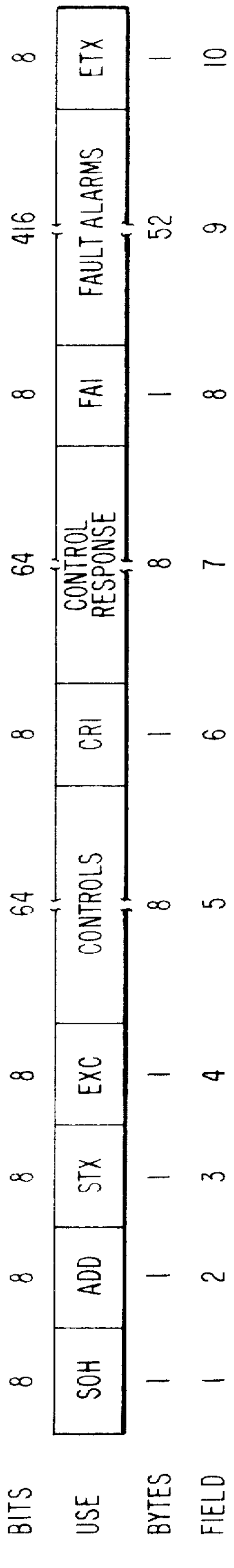
FIG. 7 is a graphic representation of maintenance information message format.

The basic unit of processing is the byte (8 bits). These bytes are aggregated into messages of 75 bytes each of which has a specific meaning and use. The format of the message is shown in FIG. 7. The various fields of the message as shown in message format (FIG. 7) are defined as follows:

Field 1. ASCII start of heading (SOH)

Field 2. Station address is binary (ADD)

Field 3. ASCII start of text (STX). This changes to the ASCII bell character (BEL) when in the emergency mode.

Field 4. Execute control character (EXC). This field is originated by the controlling district processor, and has the following values and uses:

a. ASCII zero (00110000). No control information appears in Field 5.

b. ASCII R (01010010). This indicates that control information is contained in Field 5 which is not to be executed, but is to be repeated back and forward for security purposes.

c. ASCII X (01011000). This declares the content of Field 5 to be an execute command.

Field 5. Control signals - 64-bit binary. A "1" required the relay associated with the particular bit location to respond as follows (when in *x* state):

| Prior State | Control Signal | Subsequent State |
|---|---|---|
| 0 | 0 | 0 (reset) |
| 0 | 1 | 1 (set) |
| 1 | 0 | 0 (reset) |
| 1 | 1 | 1 (set) |

Field 6. Control return identifier (CRI). This single character field is originated by the addressed DIM, and specifies the content of Field 7 as follows:

a. ASCII zero: This is the quiescent state. Field 7 is not significant (but should be filled with ASCII zeroes).

b. ASCII R: This indicates that Field 7 is a repeat of control data received from the controlling district office. When received back, it is used by that originating district office for reassurance that the control pattern was correctly transmitted and received. It is used by the backup district processor to keep informed of events in the backed-up district.

c. ASCII X: This signifies that the control pattern reflected in Field 7 has been executed. It is sent to both the controlling and backup processors.

d. ASCII ?: This signifies that a mismatch was found between the bit pattern in Field 5 of an execute message and the bit pattern in the local control register. The execute command was not obeyed. No further action on the control sequence unless other messages are received. This is the control abort sequence. It is transmitted to both the controlling and backup processors.

Field 7. Control response: This is a 64-bit binary field which is used to report the bit pattern currently in the local register. The significance derives from the choice of identifier in Field 6.

Field 8. Fault alarm identifier (FAI) – ASCII F: This indicates that the following field may contain fault alarms.

Field 9. Fault alarms: This field is a binary representation of the state of the alarms of the station whose address appears in Field 2. In a vacant frame, as transmitted from district processors, this field will contain ASCII zeroes.

Field 10. ASCII ETX character: Signifies that this is the last character of a message. This must be followed by a number (usually 3) ASCII SYN characters used by the system to establish character framing.

Figure 8:
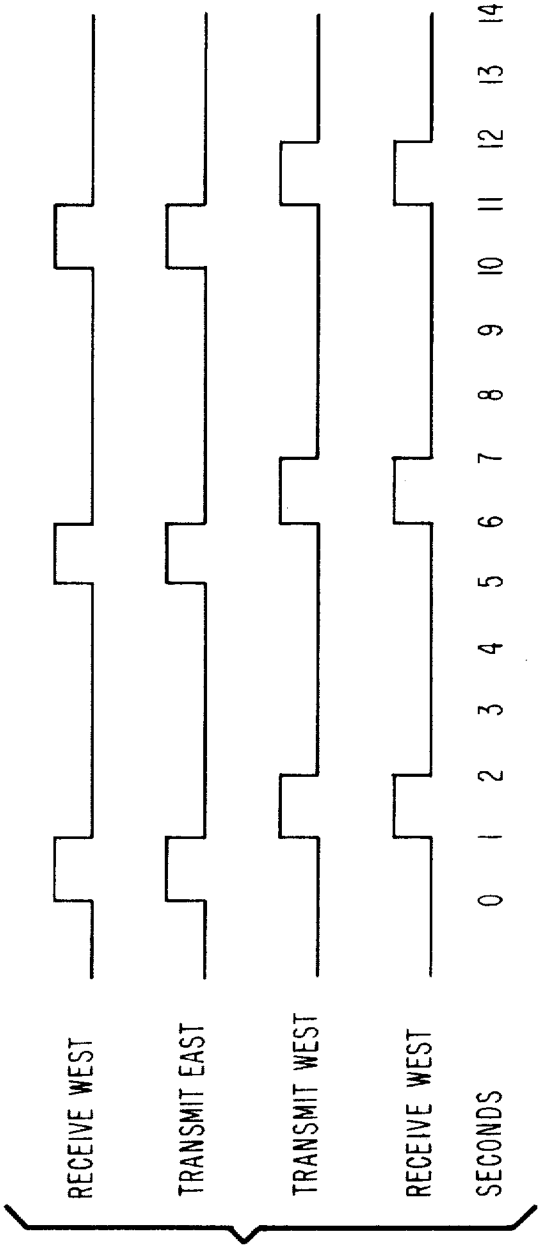
FIG. 8 is a timing diagram for east and west maintenance information-message transmitting and receiving as viewed at a district processor.

When the fault and alarm system is in operation each district processor 13 will initiate the transmission of station framing and control messages eastbound every five seconds or upon the receipt of fault alarm messages from the westward station. Similarly, each district processor 13 will initiate transmission of station framing and control messages westbound every five seconds or upon completing the reception of fault alarm messages from the east. See FIG. 8 for a timing diagram of this operation. This procedure results in the sequencing of fault alarm and control messages and hence processor loading so that a district processor has three seconds between activity periods on the high-speed lines (19.2 Kbps) during which time it may, in addition to performing main processing tasks, be characterized and function as a disk controller and output to the teletypewriter (110bps), interrogating the real-time clock, and communicating with the visual display unit and/or driving the station status display console. This procedure also results in placing messages out of phase at the nodal monitors which tends to equalize the processing load of those devices.

Message transmission is accomplished from a preformatted frame buffer of 80 bytes. After the twelfth byte of a message is transmitted from that buffer, the new station number and the associated control characters will be loaded programmtically from a core file of 64 12-byte entries, and since the eastbound and westbound messages are sent sequentially, the 80-byte buffer may be shared. Data will be supplied to the output ports in 2-byte increments every 832 microseconds, while synch characters will be transmitted between messages.

Validation procedure is provided for fault alarm (status word) reception. Each incoming status report frame will be stored in one of two core buffers. Upon receipt of a data frame, each frame will be examined for:

1. Station Sequence Check: Messages are normally originated by an adjacent district processor. If frames are not received with the proper nodal monitor sequence number, it is an indication that a break has occurred somewhere beyond the nodal monitor that is reporting out of sequence. Further verification of this is the presence of an ASCII BEL character inserted by the monitor in place of the ASCII start-of-text character. A "no data" flag would be set for all monitors beyond the nodal monitor signalling the emergency, and this status would be recorded for all those monitors by the local district processor and also reported to network control. In addition, a journal entry will be made indicating "no data" for each monitor not reporting. Receipt of a 'BEL character in any frame received from an alternate reporting station will indicate that control should be assumed for that monitor. Control for alternate stations will continue until a BEL character is replaced by a start-of-text character, indicating that the district processor with prime responsibility for the control of those stations is again in operation.

2. Control Echo Check: If the district processor has control of the nodal monitor whose frame is currently being examined, a comparison of the EXC and control return fields will be made against the EXC and controls previously transmitted. The following actions will be taken based on this comparison and the value of EXC.

EXC = O; no change in status

EXC = R and control = control return; change EXC to X in control command file.

EXC = R and control return: set retransmission count and leave command in file. When retransmission count = n, abort command, make journal entry, and notify operator that command was aborted.

EXC = X; clear control from command file, make journal entry and notify operator that command was or was not executed properly, based upon comparison of control and control return. No retransmission will be attempted.

3. Fault Alarm Check: The received fault alarm field will be compared against the same field of the last reported fault alarm currently on file for that monitor. The bits which compare will be considered valid since they have been reported twice. All valid fault alarms will be compared against the current status for that monitor. Any change will cause a dated journal entry to be built and associated bit maps to be updated, indicating that local and network control reporting is required.

The received fault alarm field will be moved into the file for the last reported fault alarm and will be compared with the next report. This double check technique will serve to eliminate transients from reporting considerations.

Many changes could be made in the abovedescribed apparatus and method and many different embodiments of this invention could be made without departing from the scope thereof. The invention could be used in the supervision of any type of system or manufacturing or communications process where fault monitoring of system or process sensors is needed as well as control of the system or process once a fault or error is detected in order to compensate for the detected fault. The invention provides distributed microprogrammably-changeable partial-intelligence throughout the system/process for local supervision and microprogrammably changeable intelligence in district areas for larger or district organized supervision, and provides information and control communication between intelligences. It is therefore intended that all matter contained in the above description of the apparatus and method be interpreted as illustrative and not in a limiting sense.

What is claimed is:

1. Fault-alarm and control system for a microwave communication network, said network having a maintenance channel in the microwave transmission for communication between transmission stations and having sensors at said local transmission stations for detecting fault conditions and having controllers at local transmission stations for affecting equipment operation, comprising:

- a first multiplicity of means each for monitoring an individual transmission station portion of said network for alarming said faults detected and for initiating limited compensating messages to said local controllers for some of said faults alarmed;
- a second multiplicity of means each for monitoring a respective fixed number of said first monitoring means for receiving fault-alarm messages generated by said fixed number of first monitoring means and for initiating compensating messages to said local controllers through said first monitoring means; and
- wherein each of said first monitoring means are communicatively tied in series with each other and to said respective second monitoring means.

2. The apparatus of claim 1 wherein each of said multiplicity of monitoring means includes a digital microprocessor; and wherein each of said second multiplicity of monitoring means includes a digital processor.

3. The apparatus of claim 2 wherein each of said digital microprocessors and each of said digital processors is microprogrammably changeable.

4. The apparatus of claim 3 wherein each monitoring means also includes:

- means associated with said digital microprocessor for coding and decoding communications from one of said second monitoring means as received from said network transmission hardware.

5. Fault-alarm and control apparatus for a microwave communications network, said network having a plurality of nodes being the radio relay stations of the network, said plurality of nodes being dividable into districts, said network also having sensors translating station and transmission status into digital signals and controls accepting digital messages for effecting equipment operation, and providing a maintenance channel for communication between nodes, comprising:

- a multiplicity of monitors, one at each of said network's nodes, said monitors being communicatively linked in series via said maintenance channel; and
- a multiplicity of processors, one each located at each of said network's districts, each of said district processors being communicatively linked with each of said monitors in its district, serially, and communicatively linked with other of said district processors, serially, through said multiplicity of monitors.

6. The apparatus of claim 5 wherein each of said monitors includes:

- a modulator/demodulator connected to said provided maintenance channel;
- a multiplexor/demultiplexor tied to said modulator/-demodulator;
- a mini-digital processor tied to said mutliplexor/-demultiplexor;
- a sensor interface connecting said processor and said network sensors at said station; and
- a control interface connecting said processor and said network controls at said station.

7. The apparatus of claim 6 wherein said mini-digital processor is microprogrammably changeable.

8. The apparatus of claim 7 wherein said district processors are microprogrammably changeable digital processors.

9. Method of fault-alarm and control in a microwave communication network, said network providing a maintenance channel for communication between microwave relay stations, said network also having sensors at each microwave relay station for translating network status into digital signals, and controls for effecting equipment operation in response to digital signals, said network further having monitors at each relay station capable of monitoring status sensed and driving said station controls, and having district processors for supervising a plurality of relay station monitors, comprising:

- sensing and storing alarm status at said relay station monitors;
- communicatively linking pluralities of said station monitors serially;
- establishing a district processor for supervising and communicating with a respective plurality of said relay station monitors;
- communicating between each district processor and its respective station monitors serially;
- performing limited maintenance decisions at said station monitors; and
- performing a majority of maintenance decisions at said district processors.

10. The method of claim 9 also including the step of:

- communicating between an adjacent district processor and said series of station monitors in the district.

11. The method of claim 10 wherein the step of communicating between station monitors includes:

- receiving a maintenance message from the neighboring monitor;
- reading data from the coded station address in the maintenance message;
- writing data in the proper station address in the maintenance message; and
- transmitting the maintenance message along to the next monitor in the series.

12. The method of claim 10 wherein the steps of communicating between district processors and respective district monitors and communicating between an adjacent district processor and said district monitors includes:

- transmitting a maintenance message containing monitor instructions from said district processor through said series of district monitors;
- decoding the message at each monitor;
- operating upon instructions decoded at each monitor;
- encoding status alarms into said maintenance message at each monitor;
- receiving said maintenance message by said adjacent district processor;

storing all status alarm information in said adjacent district processor;

transmitting an empty maintenance message back from said adjacent processor to said district processor through said series of monitors in said district;

encoding status alarms into said maintenance message at each monitor; and receiving district status alarms at said district processor.

* * * * *